(12) United States Patent
Veltman et al.

(10) Patent No.: US 7,672,402 B2
(45) Date of Patent: Mar. 2, 2010

(54) DATA PROCESSING APPARATUS AND METHOD AND ENCODING DEVICE

(75) Inventors: Markus Hendriks Veltman, Tokyo (JP); Kazunori Yasuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1081 days.

(21) Appl. No.: 11/006,419

(22) Filed: Dec. 7, 2004

(65) Prior Publication Data

US 2005/0169390 A1 Aug. 4, 2005

(30) Foreign Application Priority Data

Dec. 9, 2003 (JP) ............................. 2003-410102

(51) Int. Cl.
*H03K 9/00* (2006.01)

(52) U.S. Cl. ..................... 375/316; 375/152; 375/259; 375/342; 375/343; 375/354; 704/221; 709/203; 709/232; 370/312; 370/231

(58) Field of Classification Search ................ 375/240, 375/240.1, 316, 135–137, 146–148, 219, 375/220, 306, 259, 342, 343, 354; 370/230–231, 370/312, 412, 369, 372, 375, 538; 709/203, 709/232; 704/221, 223
See application file for complete search history.

(56) References Cited

U.S. PATENT DOCUMENTS 6,219,381 B1 * 4/2001 Sawada et al. .......... 375/240.14
7,139,241 B1 * 11/2006 Gazit ........................ 370/231
7,486,680 B1 * 2/2009 Zhang et al. ............. 370/395.4
2002/0016850 A1 * 2/2002 Fritz et al. ................ 709/232
2002/0054635 A1 * 5/2002 Nagai et al. ............. 375/240.01
2004/0218557 A1 * 11/2004 Kim et al. .................. 370/312
2005/0190833 A1 * 9/2005 Miyazawa ............. 375/240.01

* cited by examiner

*Primary Examiner*—Shuwang Liu
*Assistant Examiner*—Hirdepal Singh
(74) *Attorney, Agent, or Firm*—Finnegan, Henderson, Farabow, Garrett & Dunner, L.L.P.

(57) ABSTRACT

A data processing apparatus able to start decoding at a timing earlier than the conventional timing and able to reduce the storage capacity required for a storing means for storing the encoded data until a decoding side decodes the input encoded data in comparison with the conventional storage capacity, which apparatus selects frame data from frame data f(5) having the last decoding order to frame data f(0) having the first decoding order for processing for calculating a delay time min_delay and calculates the delay time min_delay. It calculates the delay time min_delay indicating the delay time from when the decoding side starts to receive input of the frame data to when the data is decoded based on the specified size and the bit rate of the input of the frame data to the decoding side for each of the frame data for processing.

9 Claims, 14 Drawing Sheets

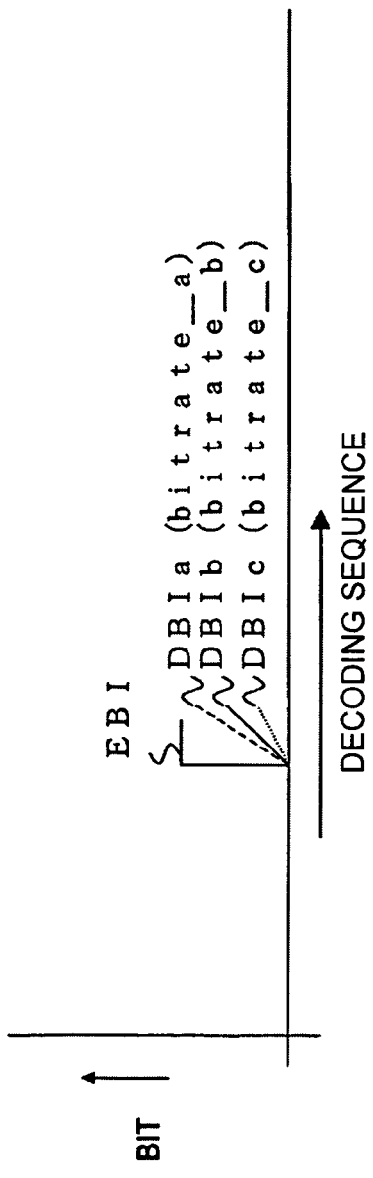
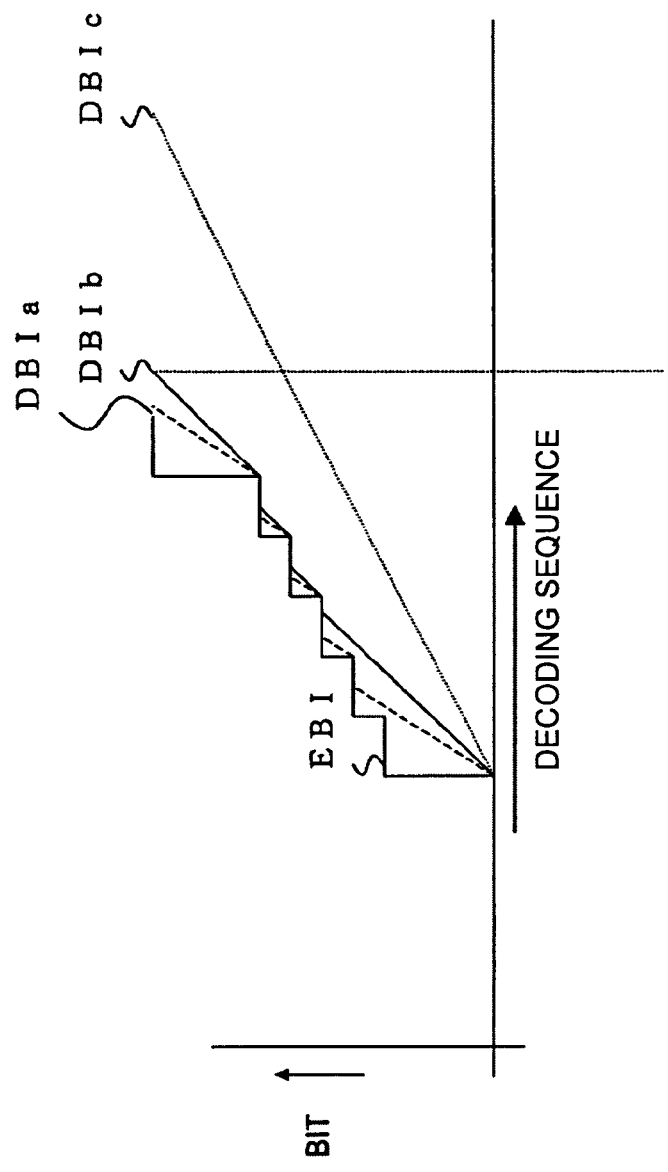
FIG. 4A
FIG. 4B

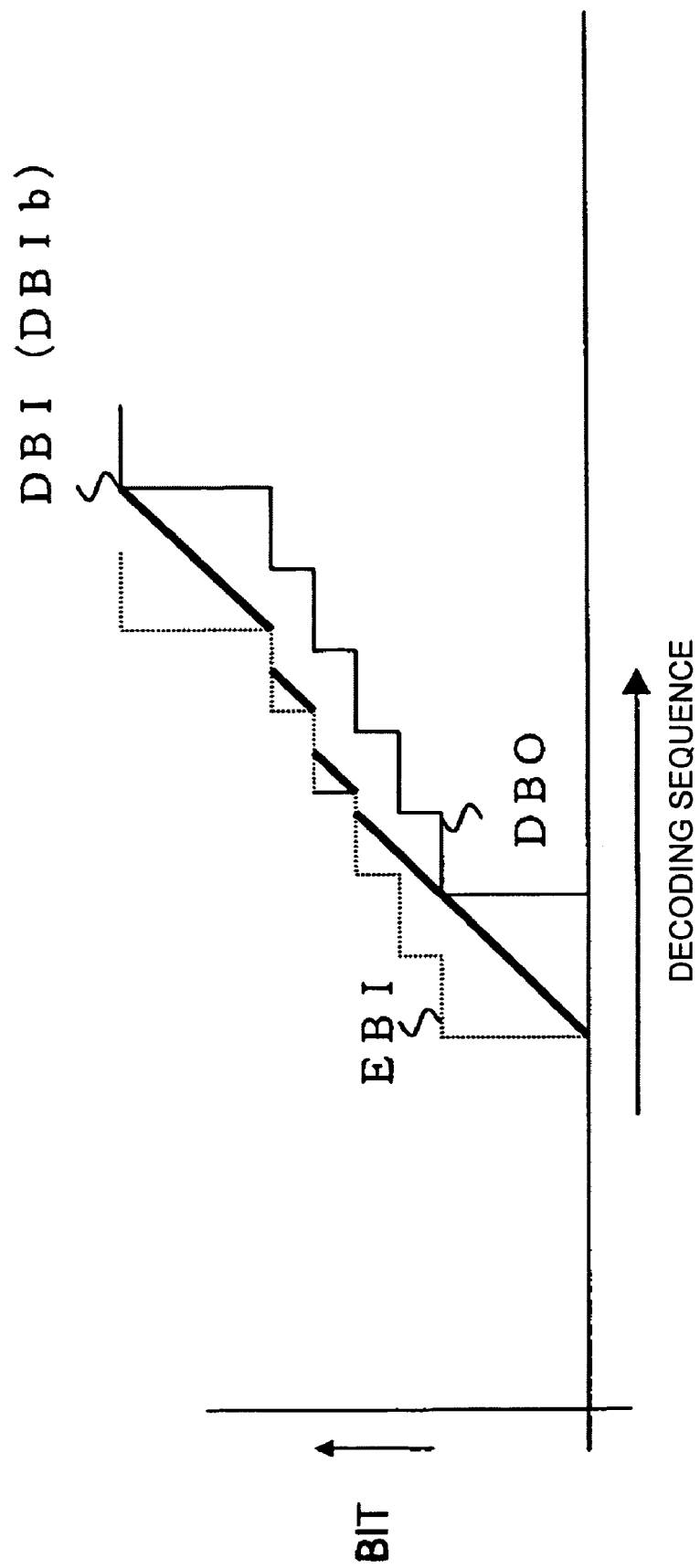

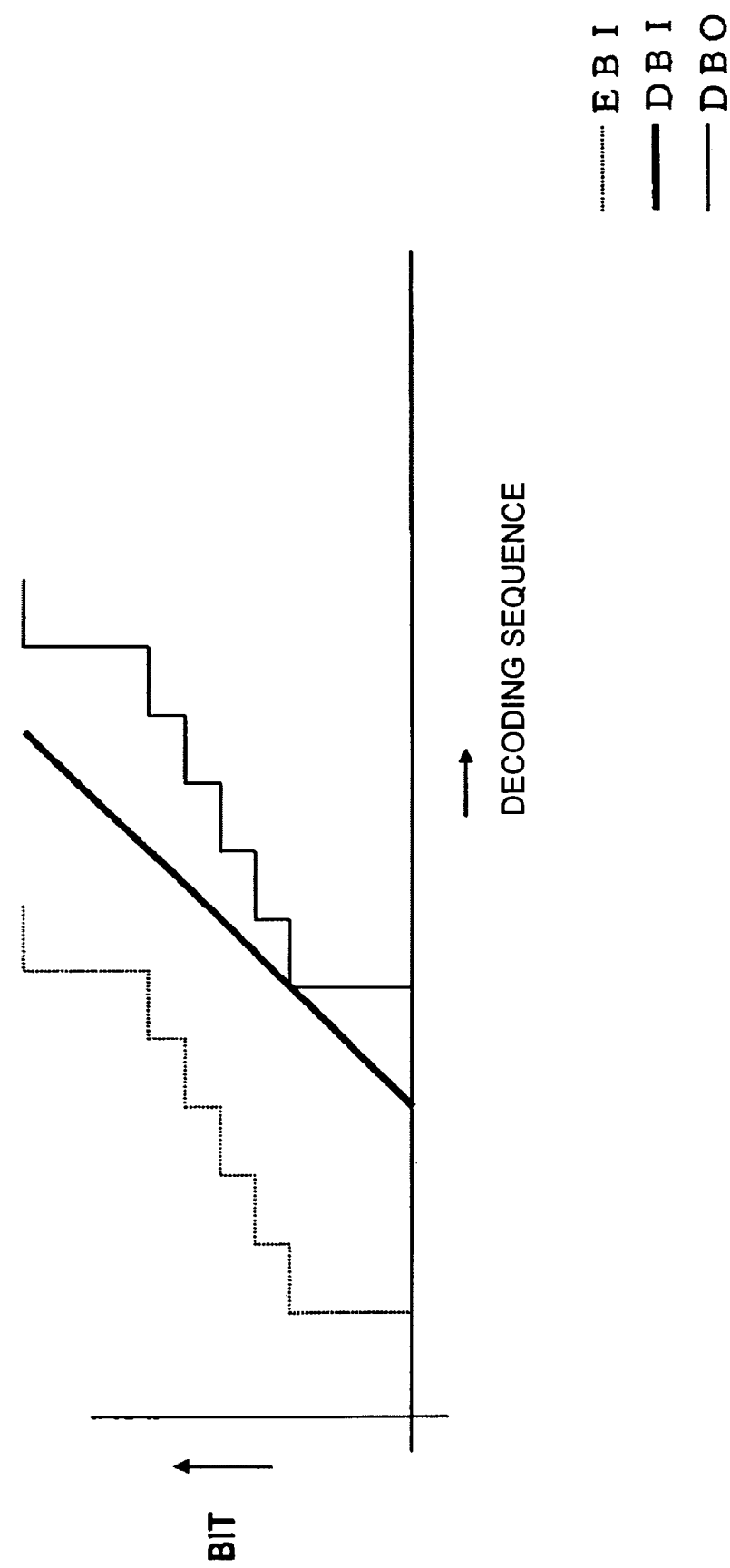

DATA PROCESSING APPARATUS AND METHOD AND ENCODING DEVICE

BACKGROUND OF THE INVENTION

1. Field of the Invention

The present invention relates to a data processing apparatus and method characterized by the method of management of a buffer provided in a decoding device and to an encoding device.

2. Description of the Related Art

There is a system of transmitting encoded video data and audio data via a network etc. or recording the same on a recording medium such as a digital versatile disk (DVD) and providing the same to a decoding device. The decoding device of such a system temporarily writes the input data into the buffer and then reads out and decodes the same.

The buffer provided in the decoding device has a limited storage capacity, and the quality of the decoded output deteriorates when the buffer underflows. Therefore, the encoding device adds delay time information indicating the time from when the frame data is written into the buffer to the time when it is read out (delay time) to the inside of the video data and the audio data in units of for example the frame data composing the video data and audio data so that the buffer will not overflow or underflow.

Conventionally, for example as shown in FIG. 14, the timing for writing encoded stream data EBI into a buffer E_BUF of the encoding device, the timing for writing encoded stream data DBI into a buffer D_BUF of the decoding device, and the timing for reading the encoded stream data DBO from the buffer D_BUF to the decoding circuit are prescribed. When transmitting the encoded stream data DBI via the network, the timing for writing the encoded stream data DBI into the buffer D_BUF of the decoding device approximately coincides with the timing for reading for example the encoded stream data DBI from the buffer E_BUF of the encoding device.

Conventionally, when determining the delay time of each frame data composing the encoded stream data DBI, a sufficient margin not allowing underflow of the buffer D_BUF is imparted to the delay time without considering the size of the frame data to be decoded after the frame data. As related art, see the specification of U.S. Pat. No. 5,511,054.

For this reason, the decoding device of the conventional system has the problems that the delay time is long, that is, a long time is taken from the reception of the frame data from the encoding device to actual decoding of the frame data, so the response is poor. For this reason, there is the problem that a large storage capacity is required for the buffer D_BUF.

SUMMARY OF THE INVENTION

An object of the present invention is to provide a data processing apparatus and method able to start the decoding at the decoding side at an earlier timing than the conventional timing and able to reduce the storage capacity required for the storing means for storing the encoded data until the decoding side decodes the input encoded data in comparison with the conventional storage capacity and to provide an encoding device for the same.

In order to solve the problems of the related art and achieve the above object, according to a first aspect of the invention, there is provided a data processing apparatus comprising a size specifying means for specifying the size of each of a plurality of encoded data to be decoded in a predetermined sequence and a calculating means for calculating a delay time from the start of input of the encoded data at the decoding side to when it is decoded for each of the encoded data, wherein the calculating means selects for processing the encoded data in the order from the encoded data to be decoded last to the encoded data to be decoded first among the plurality of encoded data and calculates the delay time of the encoded data selected for processing based on the size of the encoded data specified by the size specifying means and a bit rate with which the encoded data is input to the decoding side.

The mode of operation of the data processing apparatus of the first aspect of the invention is as follows. First, the size specifying means specifies the size of each of the plurality of encoded data to be decoded in a predetermined sequence. Next, the calculating means calculates the delay time from when input of the encoded data is started at the decoding side to when it is decoded. At this time, the calculating means selects for processing the encoded data in the order from the encoded data to be decoded last to the encoded data to be decoded first among the plurality of encoded data. Then, the calculating means calculates the delay time of the encoded data selected for processing based on the size of the encoded data specified by the size specifying means and the bit rate with which the encoded data is input to the decoding side.

According to a second aspect of the invention, there is provided a data processing method for calculating the delay time from when the decoding side starts receiving as input the encoded data to when the data is decoded by the data processing apparatus, comprising a first step of specifying the size of each of the plurality of encoded data to be decoded in a predetermined sequence and a second step of calculating the delay time for each of the encoded data, the second step selecting for processing the encoded data in order from the encoded data to be decoded last to the encoded data to be decoded first among the plurality of encoded data and calculating the delay time of the encoded data selected for processing based on the size of the encoded data specified in the first step and the bit rate with which the encoded data is input to the decoding side.

The mode of operation of the data processing method of the second aspect of the invention is as follows. First, the first step specifies the size of each of the plurality of encoded data decoded in a predetermined sequence. Next, the second step selects for processing the encoded data in the order from the encoded data to be decoded last to the encoded data to be decoded first among the plurality of encoded data. Next, the second step calculates the delay time of the encoded data selected for processing based on the size of the encoded data specified in the first step and the bit rate with which the encoded data is input to the decoding side.

According to a third aspect of the invention, there is provided an encoding device comprising an encoding means for encoding data to be encoded to generate a plurality of encoded data to be decoded in a predetermined sequence; a size specifying means for specifying the size of each of the plurality of encoded data generated by the encoding means; a calculating means for calculating a delay time from when a decoding side starts receiving as input the encoded data to when the data is decoded for each of the encoded data generated by the encoding means; and an adding means for adding delay time information indicating the delay time calculated by the calculating means to the encoded data, wherein the calculating means selects for processing the encoded data in the order from the encoded data to be decoded last to the encoded data to be decoded first among the plurality of encoded data and calculates the delay time of the encoded data selected for processing based on the size of the encoded data specified by the size specifying means and the bit rate with which the encoded data is input to the decoding side.

The mode of operation of the encoding device of the third aspect of the invention is as follows. First, the encoding means encodes data to be encoded to generate a plurality of encoded data to be decoded in a predetermined sequence. Next, the size specifying means specifies the size of each of the plurality of encoded data generated by the encoding means. Next, the calculating means calculates the delay time from when the decoding side starts receiving as input the encoded data to when the data is decoded for each of the encoded data generated by the encoding means. Next, the adding means adds delay time information indicating the delay time calculated by the calculating means to the encoded data. In the calculation of the delay time, the calculating means selects for processing the encoded data in the order from the encoded data to be decoded last to the encoded data to be decoded first among the plurality of encoded data and calculates the delay time of the encoded data selected for processing based on the size of the encoded data specified by the size specifying means and the bit rate with which the encoded data is input to the decoding side.

As explained above, according to the present invention, the object is to provide a data processing apparatus and method able to start decoding at the decoding side at an earlier timing than the conventional timing and able to reduce the amount of storage of the encoded data until the decoding side decodes the input encoded data and to provide an encoding device for the same.

BRIEF DESCRIPTION OF THE DRAWINGS

These and other objects and features of the present invention will become clearer from the following description of the preferred embodiments given with reference to the attached drawings, wherein:

FIGS. 4A and 4B are graphs for explaining processing of an F_PASS circuit shown in FIG. 3;

FIG. 5 is a graph for explaining the processing of the F_PASS circuit shown in FIG. 3;

FIG. 14 is a graph for explaining timings of encoded stream data EBI, DBI, and EBO prescribed by a conventional encoding device.

DESCRIPTION OF THE PREFERRED EMBODIMENTS

Below, an explanation will be given of a communication system according to embodiments of the present invention.

First Embodiment

Figure 1:
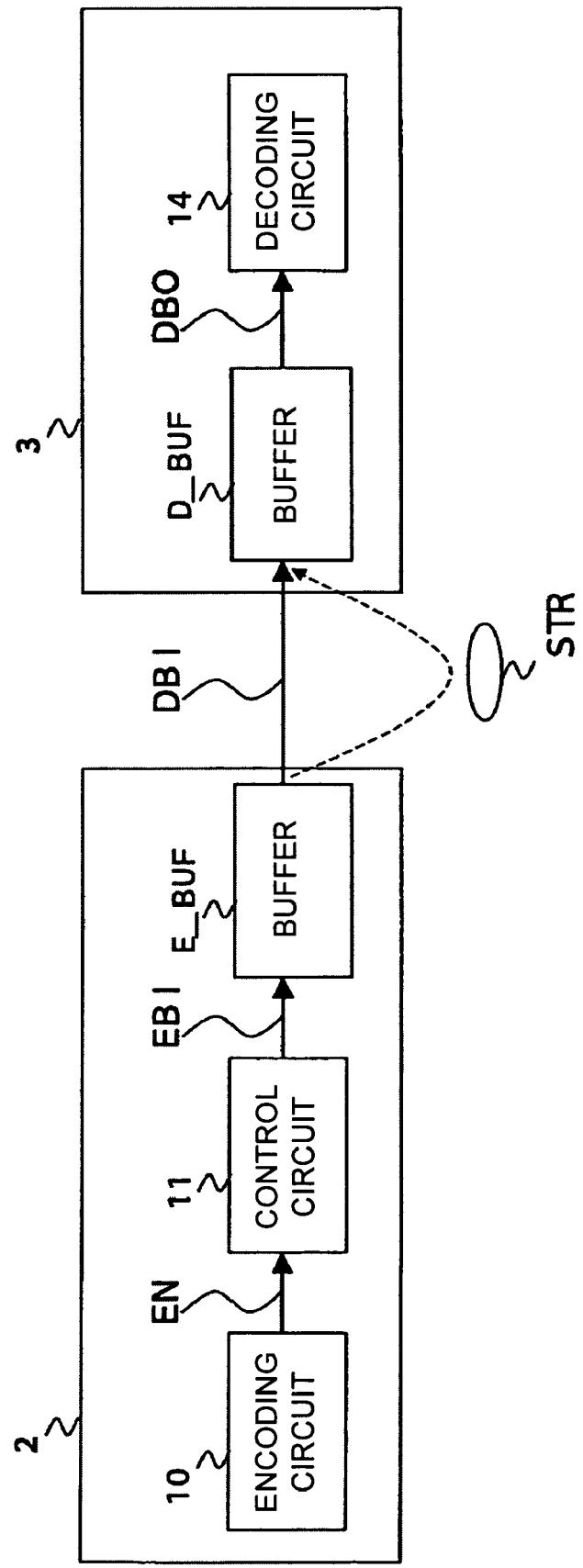
FIG. 1 is a view of the overall configuration of a communication system of a first embodiment of the present invention.

FIG. 1 is a view of the overall configuration of a communication system 1 according to a first embodiment of the present invention. As shown in FIG. 1, the communication system 1 has for example an encoding device 2 and a decoding device 3. The encoding device 2 corresponds to the encoding device of the third aspect of the invention, and the decoding device 3 corresponds to the decoding side of the present invention. The encoding device 2 generates encoded stream data DBI and transmits this via a network to the decoding device 3. Note that the encoding device 2 may also record the encoded stream data DBI on a recording medium such as a DVD, and the decoding device 3 may read out the encoded stream data DBI from the recording medium.

[Encoding Device 2]

As shown in FIG. 1, the encoding device 2 has for example an encoding circuit 10, a control circuit 11, and a buffer E_BUF. Here, the control circuit 11 corresponds to the data processing apparatus of the first and second aspects of the invention. The encoding circuit 10 generates for example encoded stream data EN of video comprised of a plurality of frame data and outputs this to the control circuit 11. The control circuit 11 adds delay time information DTI (delay time information of the present invention) to the position (for example head) of reading before the frame data (encoded data of the present invention) in the encoded stream data EN input from the encoding circuit 10 to generate the encoded stream data EBI and writes this into the buffer E_BUF. The delay time information DTI indicates the time from when the decoding device 3 starts the writing of the encoded stream data DBI into the buffer D_BUF (storing means of the present invention) to when the encoded stream data DBI is read out as the encoded stream data DBO from the buffer D_BUF for every frame. The delay time information DTI is added to immediately before the plurality of frame data in the encoded stream data DBI in units of for example the predetermined number of some frame data. Further, the control circuit 11 reads out the encoded stream data EBI stored in the buffer E_BUF as the encoded stream data DBI and transmits the same to the decoding device 3.

[Decoding Device 3]

As shown in FIG. 1, the decoding device 3 has for example a buffer D_BUF and a decoding circuit 14. The decoding device 3 writes the encoded stream data DBI received from the encoding device 2 into the buffer D_BUF. The present embodiment illustrates the case where the encoded stream data DBI is transmitted via a network. For simplifying the explanation, it is assumed that the timing of reading the encoded stream data DBI from the buffer E_BUF of the encoding device 2 and the timing of writing the same into the buffer D_BUF of the decoding device 3 coincide.

The decoding device 3 reads out the frame data as the encoded stream data DBO from the buffer E_BUF based on the delay time information DTI included in the encoded stream data DBO and outputs the same to the decoding circuit 14. The decoding circuit 14 decodes the input encoded stream data DBO in units of frames.

[Input/Output Timing of Buffers E_BUF and D_BUF]

Figure 2:
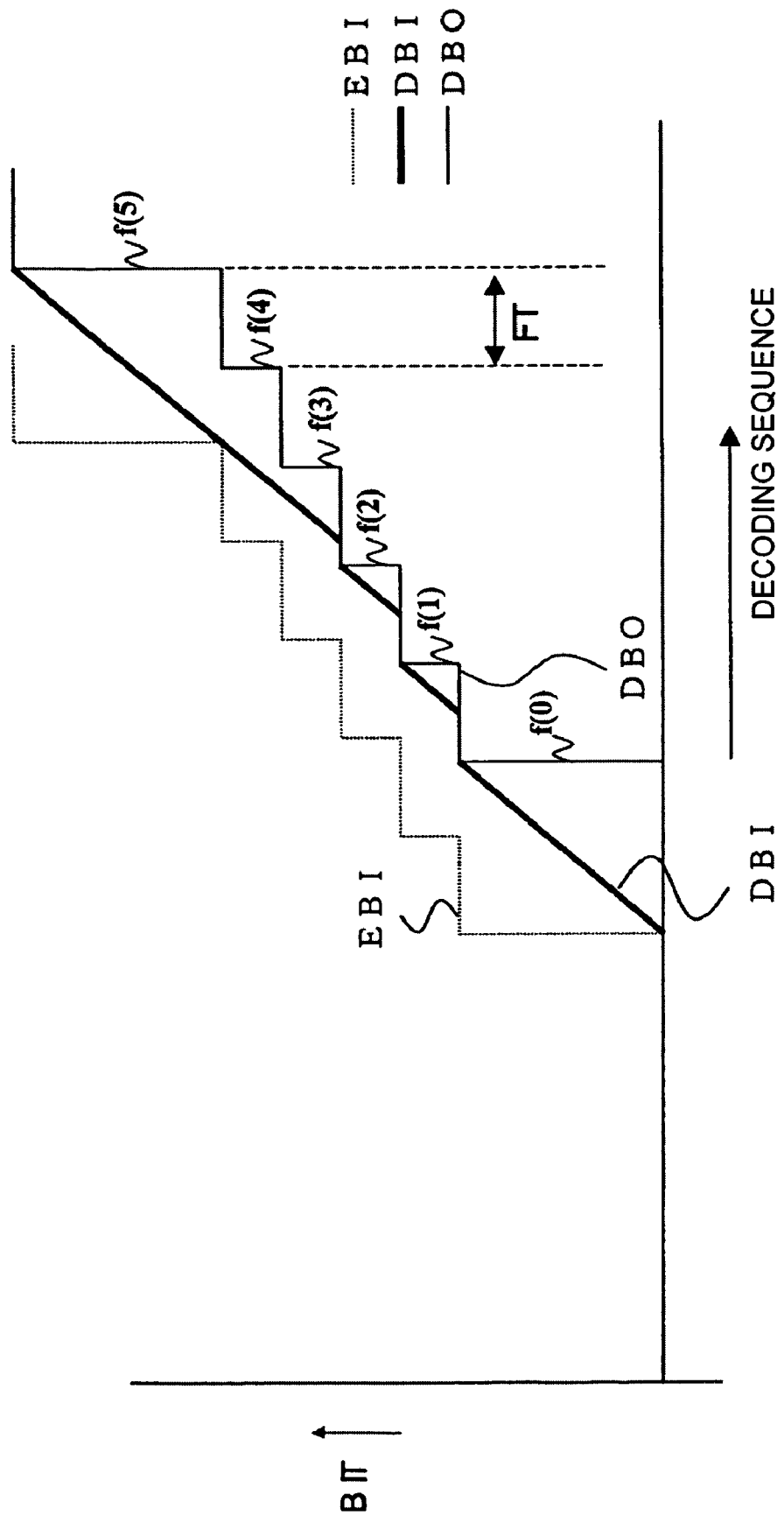
FIG. 2 is a graph for explaining timings of encoded stream data EBI, DBI, and EBO shown in FIG. 1.

FIG. 2 is a graph for explaining timings of the encoded stream data EBI, DBI, and DBO shown in FIG. 1. Below, a general explanation will be given of the timings shown in FIG. 2. The timings shown in FIG. 2 are prescribed by the control circuit 11 of the encoding device 2 shown in FIG. 1. Namely, the control circuit 11 specifies the size of each of a plurality of frame data composing the encoded stream data EN and to be decoded in a predetermined sequence. Then, the control circuit 11 selects for processing the frame data from the frame data f(5) having the last decoding order to the frame data f(0) having the first decoding order for calculating the delay time min_delay and calculates the delay time min_delay. The control circuit 11 calculates the delay time min_delay indicating the delay time from when the decoding device 3 starts receiving as input the frame data (the writing of the frame data into the buffer D_BUF) to when the data is decoded (read out from the buffer D_BUF) based on the specified size and the bit rate with which the frame data is input to the decoding device 3 for each of the frame data for processing. At this time, the control circuit 11 calculates the delay time min_delay so that the frame data to be decoded last is read out from the buffer D_BUF and output to the decoding circuit 14 at the timing when the writing of the frame data to be decoded last among the frame data in the encoded stream data EN into the buffer D_BUF is completed. Further, the control circuit 11 sequentially selects the frame data for processing from the frame data to be decoded last to the frame data to be decoded first and calculates the delay time min_delay of the frame data selected.

[Encoding Device 2]

Figure 3:
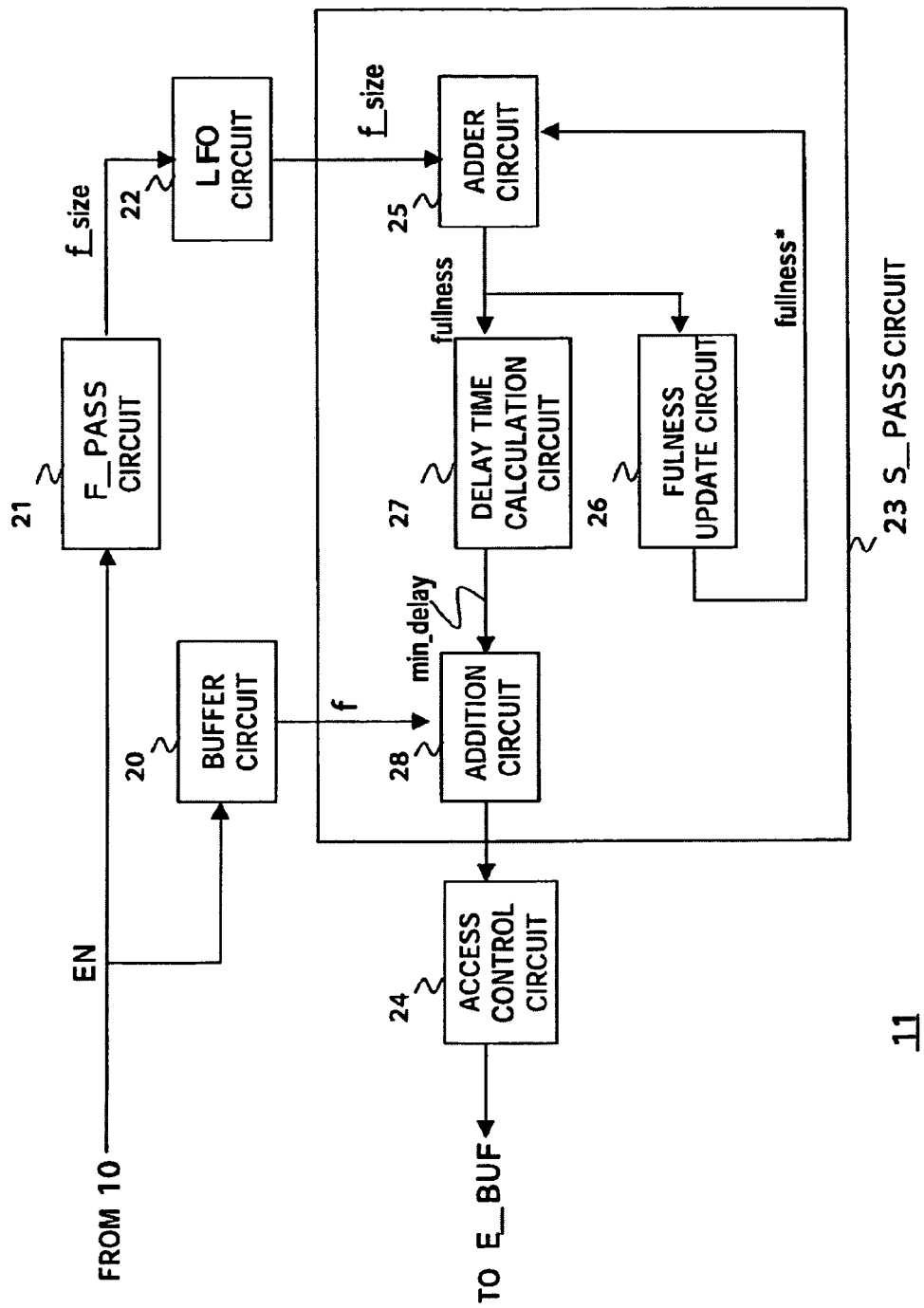
FIG. 3 is a view of the configuration of a control circuit shown in FIG. 1.

FIG. 3 is a view of the configuration of the control circuit 11 shown in FIG. 1. As shown in FIG. 3, the control circuit 11 has for example a buffer circuit 20, an F_PASS circuit 21, a LIFO circuit 22, an S_PASS circuit 23, and an access control circuit 24. Here, the F_PASS circuit 21 corresponds to the size specifying means of the first and third aspects of the invention, and the S_PASS circuit 23 corresponds to the calculating means of the first and third aspects of the invention.

The buffer circuit 20 temporarily stores the encoded stream data EN input from the encoding circuit 10 and outputs the same to an addition circuit 28. The F_PASS circuit 21 traces the encoded stream data EN input from the encoding circuit 10 from the head to the tail, specifies the size f_size of each frame data f, and outputs this to the LIFO circuit 22. Further, the F_PASS circuit 21 selects the bit rate (bit frame of the present invention) predicted to minimize the sum of the delay time min_delay of a plurality of frame data f(0) to f(5) based on the size f_size of each specified frame data f and the size of the buffer D_BUF and within a range that will not cause overflow or underflow of the buffer D_BUF for a plurality of bit rates shown in FIG. 4A prescribed in advance, for example, the bit rates DBIa, DBIb, and DBIc (bitrate_a, b, c). The F_PASS circuit 21 outputs the selected bit rate to a fullness update circuit 26 and a delay time calculation circuit 27 of the S_PASS circuit 23. In the example of FIG. 4A, for each of the encoded stream data DBIa, DBIb, and DBIc in accordance with the bit rates bitrate_a, b, c, relationships of the encoded stream data EBI, DBI, and DBO in the case where these are selected become as shown in FIG. 4B. The F_PASS circuit 21 selects the bit rate bitrate_b as shown in FIG. 5 based on these relationships.

The LIFO circuit 22 outputs the size f_size input from the F_PASS circuit 21 to the adder circuit 25 of the S_PASS circuit 23 by FIFO (First In First Out).

The S_PASS circuit 23 has for example an adder circuit 25, the fullness update circuit 26, the delay time calculation circuit 27, and the addition circuit 28 as shown in FIG. 3. Here, the adder circuit 25, the fullness update circuit 26, and the delay time calculation circuit 27 correspond to the calculating means of the present invention, and the addition circuit 28 corresponds to the adding means of the present invention. The adder circuit 25 adds the size f_size of the frame to be processed input from the LIFO circuit 22 to the remainder data fullness* (total amount of data the present invention) for each frame to calculate the new remainder data fullness. The adder circuit 25 outputs the calculated remainder data fullness to the update circuit 26 and the delay time calculation circuit 27. The fullness update circuit 26 subtracts a multiplication result (first amount of data of the present invention) of the bit rate bitrate and the frame processing time FT (time required for the decoding for the encoded data of the present invention) from the remainder data fullness (total amount of data of the present invention) input from the adder circuit 25 for each frame and uses the larger of the subtraction value and "0" as new remainder data fullness* (second amount of data of the present invention).

The delay time calculation circuit 27 divides the remainder data fullness input from the adder circuit 25 by the bit rate to calculate the delay time min_delay and outputs this to the addition circuit 28.

The addition circuit 28 adds the delay time information DTI including the delay time min_delay of all frames input from the delay time calculation circuit 27 to the head of the encoded stream data EN input from the buffer circuit 20. The access control circuit 24 writes the encoded stream data EN added with the delay time information DTI at the addition circuit 28 at the timing shown in FIG. 2 into the buffer E_BUF as the encoded stream data EBI. Further, the access control circuit 24 reads out the encoded stream data EBI from the buffer E_BUF as the encoded stream data DBI at the timing shown in FIG. 2 and transmits the same to the decoding device 3.

Figure 6:
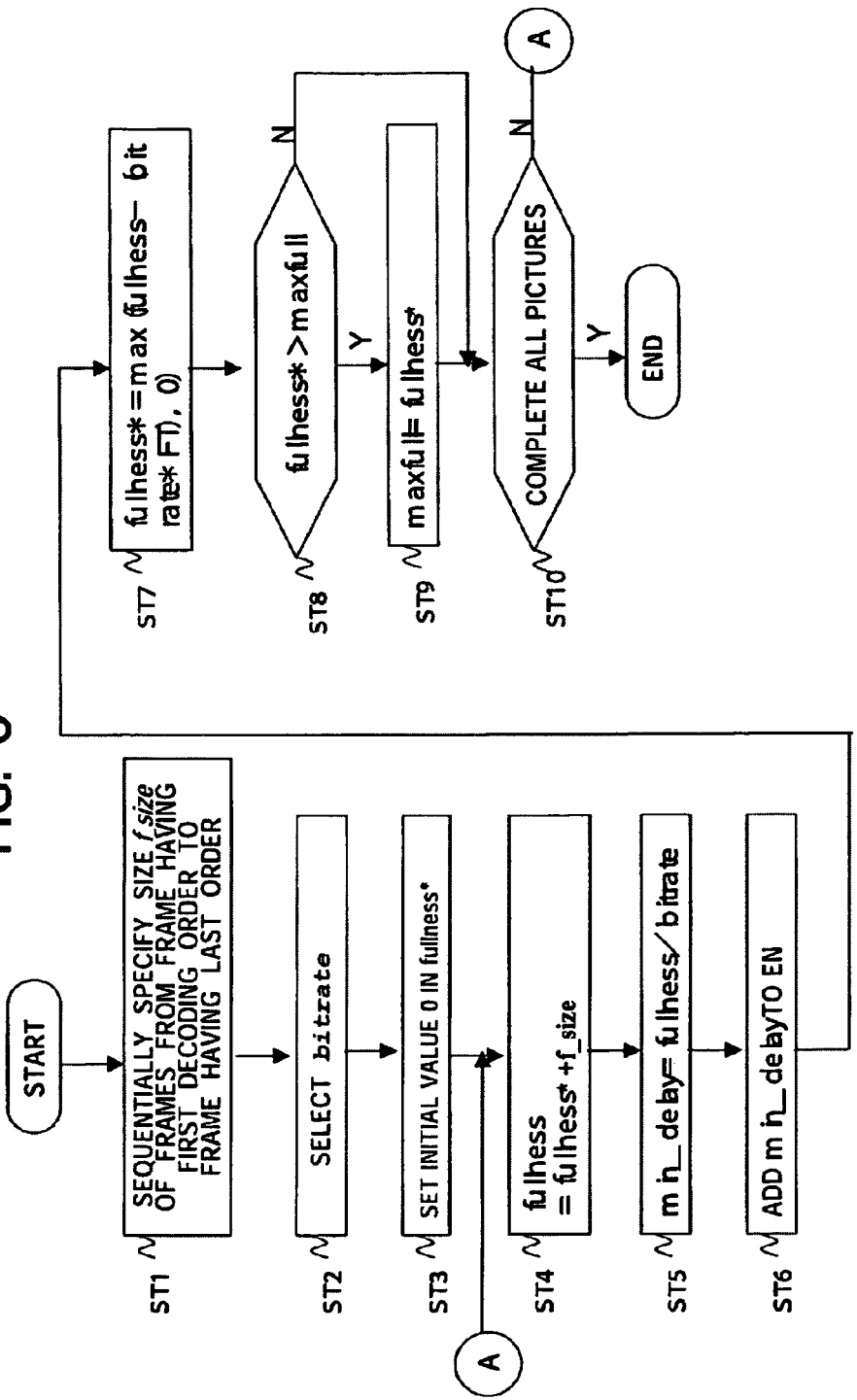
FIG. 6 is a flow chart for explaining an example of the operation of the control circuit shown in FIG. 3.

Below, an explanation will be given of an example of the operation of the control circuit 11 shown in FIG. 3. FIG. 6 is a flow chart for explaining an example of the operation of the control circuit 11 shown in FIG. 3.

Step ST1

The F_PASS circuit 21 shown in FIG. 3 traces the encoded stream data EN input from the encoding circuit 10 from the head (frame data to be decoded first) to the tail (frame data to be decoded last), specifies the size f_size of each frame data f, and outputs this to the LIFO circuit 22.

Step ST2

Further, as explained by using FIGS. 4A and 4B and FIG. 5, the F_PASS circuit 21 selects the bit rate bitrate (bitrate_b) predicted to minimize the sum of the delay time min_delay of a plurality of frame data f(0) to f(5) within a range not causing overflow or underflow of the buffer D_BUF based on the size f_size of each specified frame data f and the size of the buffer D_BUF. The F_PASS circuit 21 outputs the selected bit rate to the fullness update circuit 26 and the delay time calculation circuit 27 of the S_PASS circuit 23.

Step ST3

The fullness update circuit 26 of the S_PASS circuit 23 sets an initial value "0" in the remainder data fullness*. Then, the S_PASS circuit 23 selects the frame data to be processed in the order from the frame data to be decoded last to the frame data to be decoded first and generates the delay time min_delay of the frame data for processing in the following steps based on the size f_size input from the LIFO circuit 22 for the selected frame data for processing.

Step ST4

The adder circuit 25 adds the size f_size of the frame for processing input from the LIFO circuit 22 to the remainder data fullness* of the frame data f to be processed to calculate the new remainder data fullness. The adder circuit 25 outputs the calculated remainder data fullness to the fullness update circuit 26 and the delay time calculation circuit 27.

Step ST5

The delay time calculation circuit 27 divides the remainder data fullness input from the adder circuit 25 by the bit rate bitrate for the frame data f for processing to calculate the delay time min_delay and outputs this to the addition circuit 28.

Step ST6

The addition circuit 28 adds the delay time min_delay of the frame data for processing input from the delay time calculation circuit 27 at step ST5 to the delay time information DTI added to the head of the encoded stream data EN stored in the buffer circuit 20.

Step ST7

The fullness update circuit 26 subtracts the multiplication result of the bit rate bitrate and the frame processing time ET from the remainder data fullness input from the adder circuit 25 for the frame data f for processing and defines the larger of the subtraction value and "0" as the new remainder data fullness*.

Step ST8

The fullness update circuit 26 decides whether or not the remainder data fullness* calculated at step ST7 is larger than the maximum remainder data maxfull. When deciding it is larger, the routine proceeds to step ST9, while when not deciding so, the routine proceeds to step ST10.

Step ST9

The fullness update circuit 26 defines the remainder data fullness* calculated at step ST7 as the maximum remainder data maxfull. The maximum remainder data maxfull is added to for example the encoded stream data DBI and utilized so as to store reference frame data referred to by other frame data when decoding part of the buffer E_BUF, that is, is utilized as a frame buffer. Note that the encoding device 2 can generate information indicating how many frame buffers the unused storage region of the buffer D_BUF can be utilized as by dividing the remainder obtained by subtracting for example the maximum remainder data maxfull from the entire storage capacity of the buffer D_BUF by the unit size of the frame buffer and can add this to the encoded stream data DBI.

Step ST10

The S_PASS circuit 23 decides whether or not the delay time min_delay was calculated for all frame data f of the encoded stream data EN. When deciding that the delay time was calculated, it ends the processing, while when not deciding so, the routine proceeds to the processing of step ST4 for the next frame data f. When the S_PASS circuit 23 ends the processing shown in FIG. 6, the access control circuit 24 writes the encoded stream data EN added with the delay time information DTI and the maximum remainder data maxfull in the addition circuit 28 into the buffer E_BUF as the encoded stream data EBI. Further, the access control circuit 24 reads out the encoded stream data EBI from the buffer E_BUF as the encoded stream data DBI and transmits the same to the decoding device 3 at the timing shown in FIG. 2.

Figure 7:
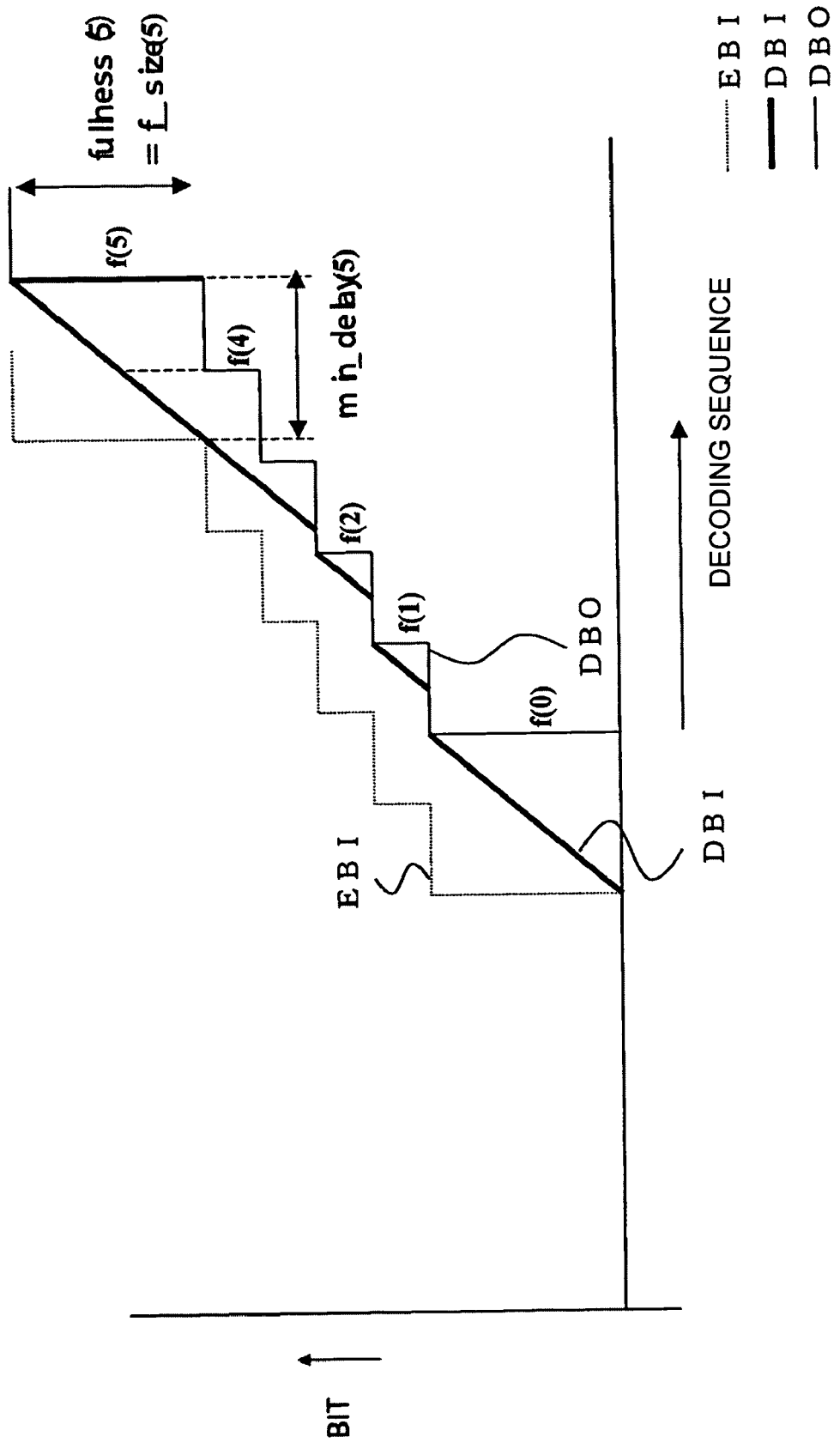
FIG. 7 is a graph for explaining an example of sequentially calculating a delay time min_delay of each frame data f(5) of the encoded stream data DBI shown in FIG. 2 according to steps ST3 to ST10 shown in FIG. 6.

Below, an explanation will be given of an example of sequentially calculating the delay time min_delay of the frame data f(5), f(4), f(3), f(2), f(1), and f(0) of the encoded stream data DBI shown in FIG. 2 according to steps ST3 to ST10 shown in FIG. 6. First, before performing the processing of step ST4 for the frame data f(5) for processing, the fullness update circuit 26 sets the initial value "0" in the remainder data fullness* at step ST3. Then, the adder circuit 25 adds the size f_size (5) of the frame data f(5) to the remainder data fullness* (=0) to calculate the new remainder data fullness(5) as shown in FIG. 7 (ST4), divides this by the bit rate bitrate, and calculates the delay time min_delay(5) (ST5). Subsequently, the fullness update circuit 26 subtracts the multiplication result of the bit rate bitrate and the frame processing time FT (=FT*bitrate) from the remainder data fullness(5) input from the adder circuit 25 as shown in FIG. 8 and defines the larger of the subtraction value (fullness(5)−FT*bitrate) and "0" (the subtraction value in this case) as new remainder data fullness*(5) (ST7).

Figure 8:
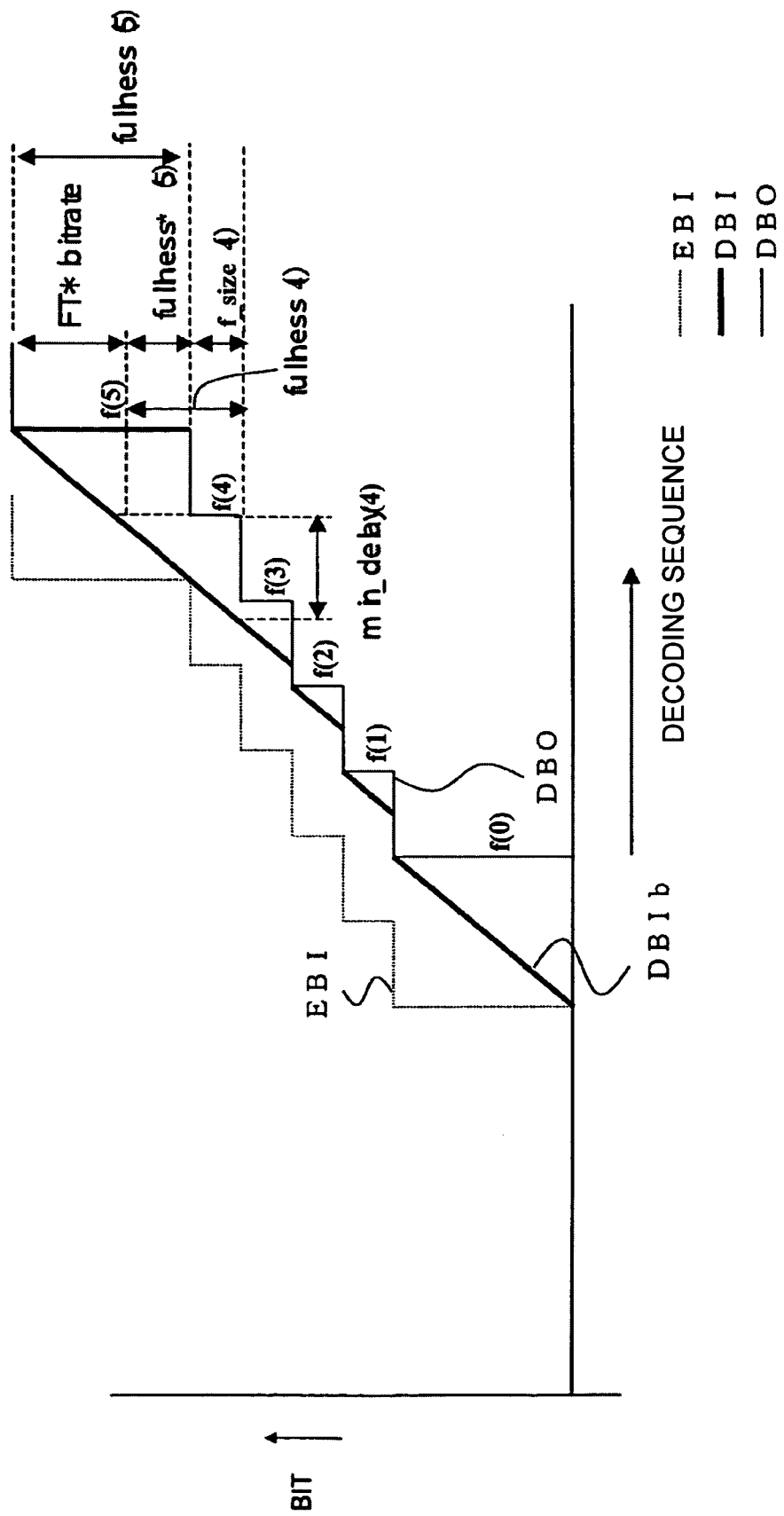
FIG. 8 is a graph for explaining an example of sequentially calculating a delay time min_delay of each frame data f(4) of the encoded stream data DBI shown in FIG. 2 according to steps ST3 to ST10 shown in FIG. 6.

Next, the adder circuit 25 adds the size f_size(4) of the frame data f(4) to the remainder data fullness*(5) to calculate the new remainder data fullness(4) as shown in FIG. 8 (ST4) and divides this by the bit rate bitrate to calculate the delay time min_delay(4) (ST5). Subsequently, the fullness update circuit 26 subtracts the multiplication result of the bit rate bitrate and the frame processing time FT (=FT*bitrate) from the remainder data fullness(4) input from the adder circuit 25 as shown in FIG. 9 and defines the larger of the subtraction value (fullness(4)−FT*bitrate) and "0" (the subtraction value in this case) as the new remainder data fullness*(4) (ST7).

Figure 9:
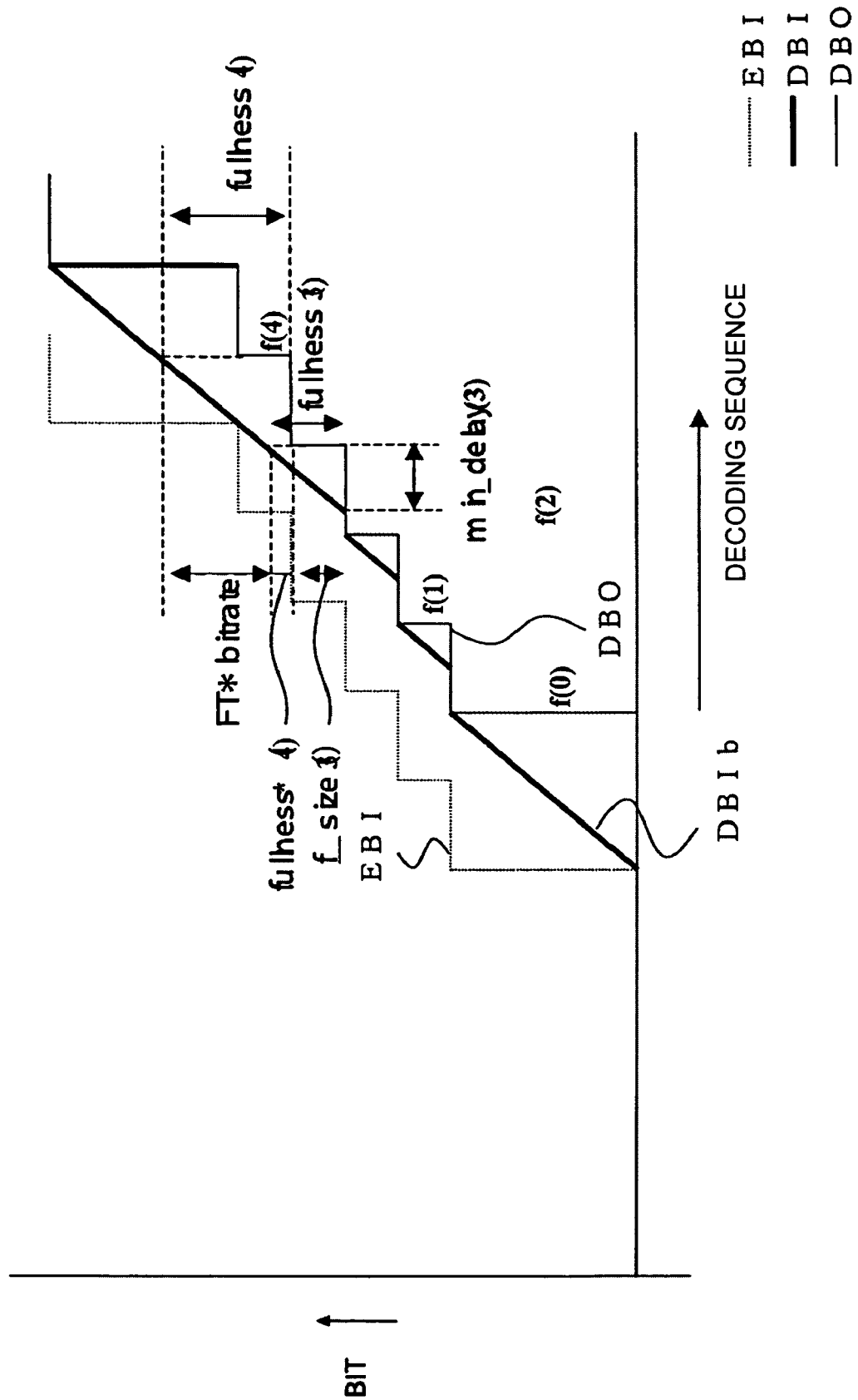
FIG. 9 is a graph for explaining an example of sequentially calculating a delay time min_delay of each frame data f(3) of the encoded stream data DBI shown in FIG. 2 according to steps ST3 to ST10 shown in FIG. 6.

Next, the adder circuit 25 adds the size f_size(3) of the frame data f(3) to the remainder data fullness*(4) to calculate the new remainder data fullness(3) as shown in FIG. 9 (ST4) and divides the result by the bit rate bitrate to calculate the delay time min_delay(3) (ST5). Then, the fullness update circuit 26 subtracts the multiplication result of the bit rate bitrate and the frame processing time FT (=FT*bitrate) from the remainder data fullness(3) input from the adder circuit 25 and defines the larger of the subtraction value (fullness(3)−FT*bitrate) and "0" (0 in this case) as the new remainder data fullness*(3) (ST7).

Figure 10:
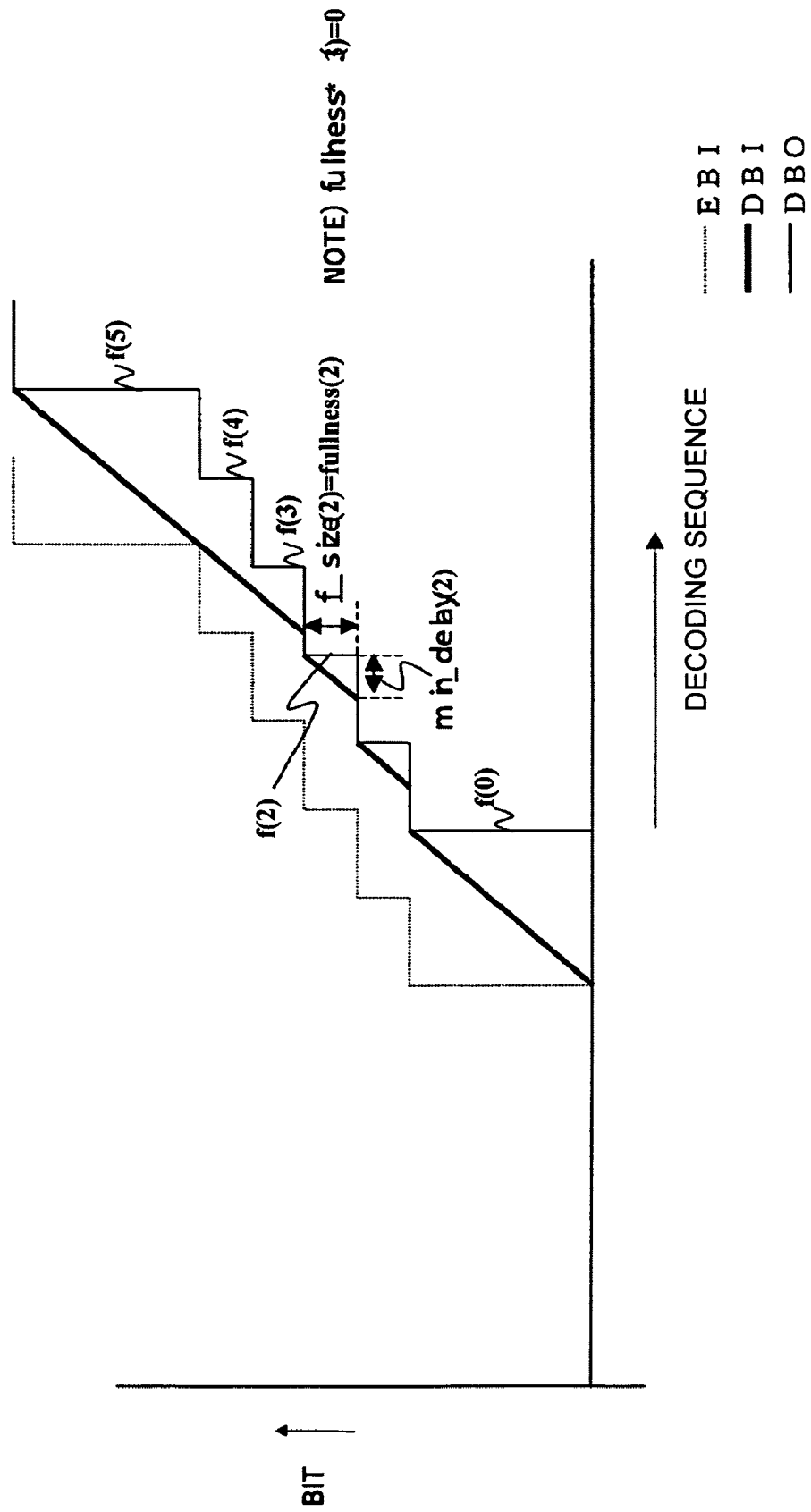
FIG. 10 is a graph for explaining an example of sequentially calculating a delay time min_delay of each frame data f(2) of the encoded stream data DBI shown in FIG. 2 according to steps ST3 to ST10 shown in FIG. 6.

Next, the adder circuit 25 adds the size f_size(2) of the frame data f(2) to the remainder data fullness*(3) to calculate the new remainder data fullness(2) (=f_size(2)) as shown in FIG. 10 (ST4) and divides this by the bit rate bitrate to calculate the delay time min_delay(2) (ST5). Subsequently, the fullness update circuit 26 subtracts the multiplication result of the bit rate bitrate and the frame processing time FT (=FT*bitrate) from the remainder data fullness(2) input from the adder circuit 25 and defines the larger of the subtraction value (fullness(2)−FT*bitrate) and "0" (0 in this case) as the new remainder data fullness*(2) (ST7).

Figure 11:
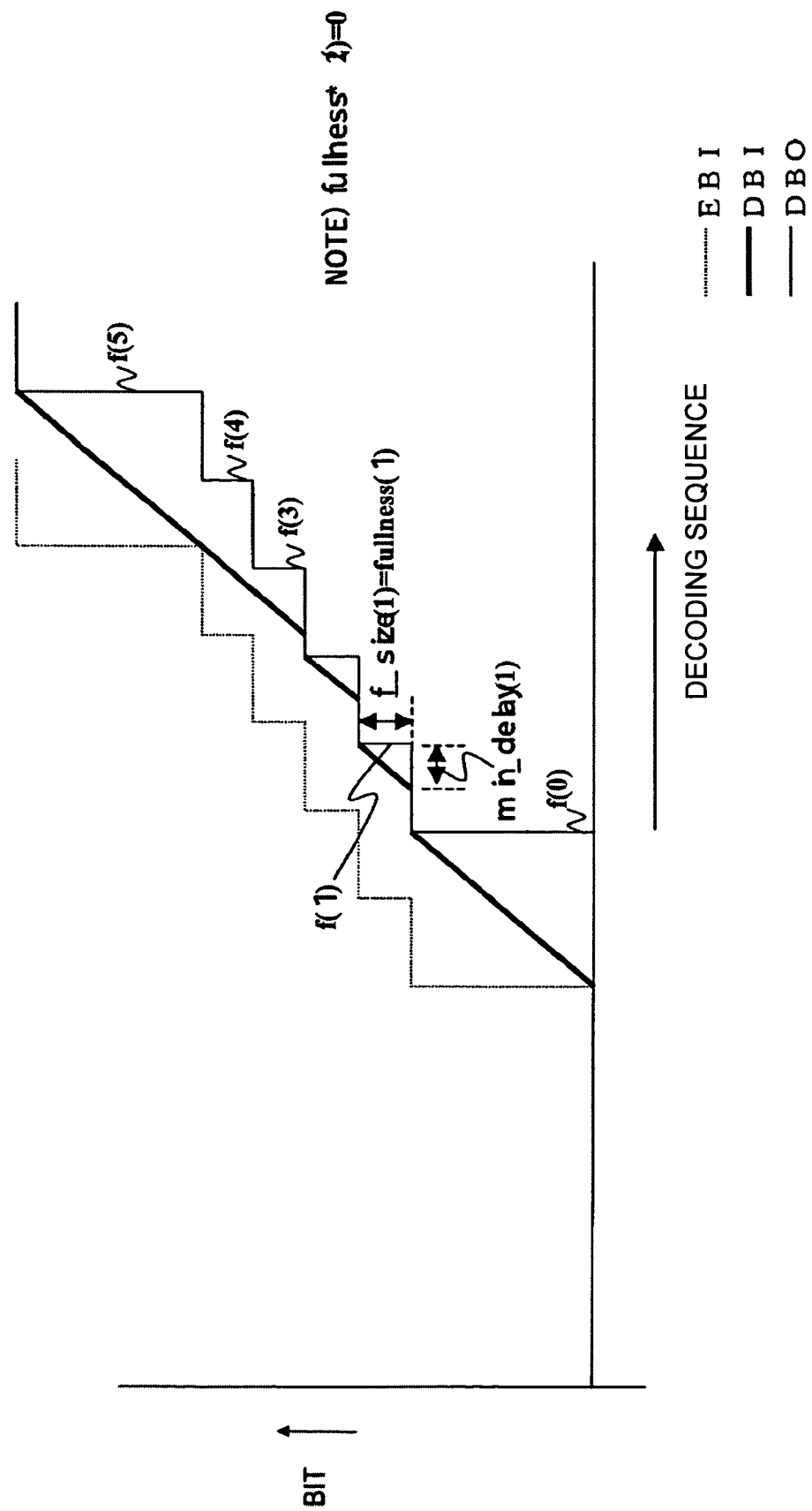
FIG. 11 is a graph for explaining an example of sequentially calculating a delay time min_delay of each frame data f(1) of the encoded stream data DBI shown in FIG. 2 according to steps ST3 to ST10 shown in FIG. 6.

Next, the adder circuit 25 adds the size f_size(1) of the frame data f(1) to the remainder data fullness*(2) to calculate new remainder data fullness(1)(=f_size(1)) as shown in FIG. 11 (ST4) and divides this by the bit rate bitrate to calculate the delay time min_delay(1) (ST5). Then, the fullness update circuit 26 subtracts the multiplication result of the bit rate bitrate and the frame processing time FT (=FT*bitrate) from the remainder data fullness(1) input from the adder circuit 25 and defines the larger of the subtraction value (fullness(1)−FT* bitrate) and "0" (0 in this case) as the new remainder data fullness*(1) (ST7).

Figure 12:
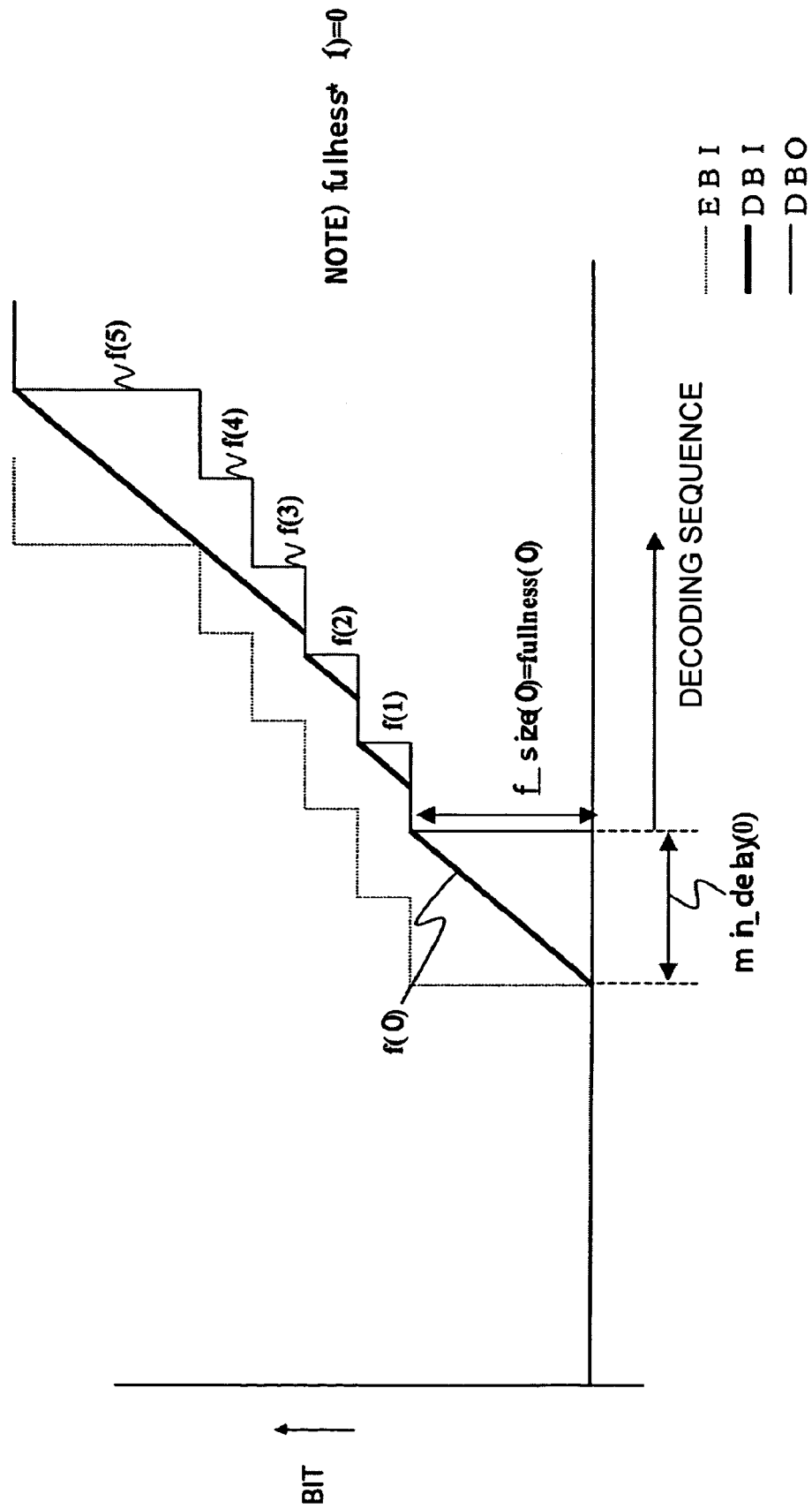
FIG. 12 is a graph for explaining an example of sequentially calculating a delay time min_delay of each frame data f(0) of the encoded stream data DBI shown in FIG. 2 according to steps ST3 to ST10 shown in FIG. 6.

Next, the adder circuit 25 adds the size f_size(0) of the frame data f(0) to the remainder data fullness*(1) to calculate the new remainder data fullness(0) (=f_size(0)) as shown in FIG. 12 (ST4) and divides this by the bit rate bitrate to calculate the delay time min_delay(0) (ST5).

As explained above, the encoding device 2 calculates the delay time min_delay of each frame data in the sequence explained by using FIG. 6 and adds the delay time information DTI including this to the encoded stream data DBI. The decoding device 3 can prescribe the relationship between the encoded stream data DBI and DBO as shown in FIG. 2 based on the delay time information DTI added to the encoded stream data DBI. Here, according to the communication system 1, as seen by comparison between FIG. 2 and the conventional FIG. 14, the delay time min_delay of the frame data f(1) to f(5) is shorter in the case of the present embodiment shown in FIG. 2 in comparison with the conventional case shown in FIG. 14, and the response of decoding in the decoding device 3 becomes better in comparison with the conventional case. Further, in the decoding device 3, the amount of data stored in the buffer D_BUF immediately before reading each frame data from the buffer D_BUF is smaller in the case of the present embodiment shown in FIG. 2 in comparison with the conventional case shown in FIG. 14, so the storage capacity required for the buffer D_BUF can be made smaller.

Second Embodiment

Figure 13:
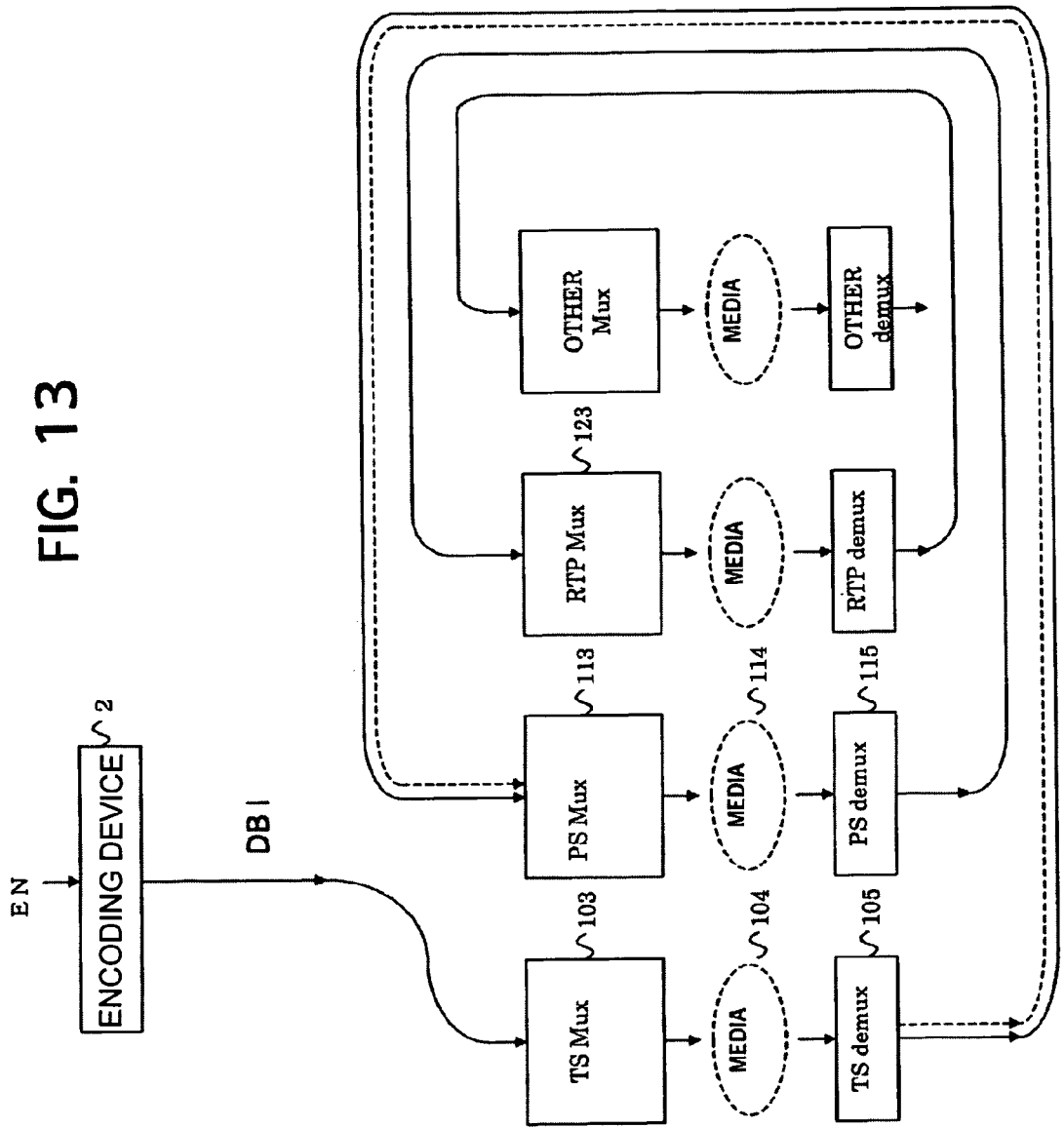
FIG. 13 is a diagram for explaining an example of application of an encoding device shown in FIG. 1.

In the present embodiment, an explanation will be given of the mode of use of the delay time information DTI indicating the delay time min_delay determined in the encoding device 2 by referring to FIG. 13. For example, the encoding device 2 explained in the first embodiment generates the encoded stream data DBI including the delay time information DTI and transmits this to a TSMux device 103 as shown in FIG. 13. The TSMux device 103 transmits the encoded stream data to the TSdemux 105 by a transport stream via a medium such as a digital broadcast. In this case, the TSMux device 103 utilizes the delay time min_delay indicated by the delay time information DTI included in the encoded stream data DBI and transmits this via the medium 104 to the TSdemux 105 without newly generating the delay time min_delay. The TSdemux 105 decodes the encoded stream data received via the medium 104, then outputs this together with the delay time information DTI to a PSMux 113.

The PSMux 113 utilizes the delay time information DTI included in the encoded stream data input from the TSdemux 105 and provides the encoded stream data to a PSdemux 115 via a medium 114 such as a DVD by a program stream without generating new delay time min_delay. Then, the PSdemux 115 decrypts the encoded stream data input via the medium 114 and outputs this to an RTPmux 123. Here, the RTPmux 123 employs RTP (Real Time Protocol) for streaming reproducing the audio and video, so cannot transmit the delay time information DTI. For this reason, by the transmission by the RTP, the delay time information DTI is lost and cannot be utilized in the later Mux device.

Note that it is also possible that the encoded stream data EN be directly input to the TSMux device 103 and that the TSMux device 103 generate the delay time information DTI by the same configuration as that of the control circuit 11.

Further, for example, it is also possible that the flag data indicating whether or not the delay time information DTI be included in the encoded stream data EN transmitted by the encoding device 2 and that the TSMux device 103 determine whether or not the delay time information DTI in the encoded stream data EN is utilized based on the flag data.

The present invention is not limited to the above embodiments. In the embodiments, as shown in FIG. 1, the case where the encoded stream data DBI was transmitted from the encoding device 2 to the decoding device 3 via a network etc. was illustrated as shown in FIG. 1, but it is also possible to record the encoded stream data DBI on a recording medium STR such as a DVD and provide the same to the decoding device 3. In this case as well, the encoding device 2 determines the delay time min_delay in the sequence shown in FIG. 9, stores the delay time information DTI indicating this in the encoded stream data DBI, and writes this into the recording media STR. The decoding device 3 reads out the encoded stream data DBI from the recording media and writes the same into the buffer D_BUF at the timing of the encoded stream data DBI shown in FIG. 2. Then, the decoding device 3 reads out the frame data from the buffer D_BUF at the timing of the encoded stream data DBO shown in FIG. 2 based on the delay time information DTI included in the encoded stream data DBI. In this case as well, the same effects as those of the first embodiment are obtained.

Further, in the above embodiments, the case where the bit rate bitrate was fixed was illustrated, but the rate may be variable too.

Summarizing the effects of the invention, the present invention provides a data processing apparatus and method characterized by the method of management of the buffer provided in the decoding device and provides an encoding device for the same.

While the invention has been described with reference to specific embodiments chosen for purpose of illustration, it should be apparent that numerous modifications could be made thereto by those skilled in the art without departing from the basic concept and scope of the invention.

What is claimed is:

1. A data processing apparatus comprising:
   means for specifying sizes corresponding to encoded data frames, the encoded data frames to be decoded in a predetermined sequence;
   means for selecting a bit rate for inputting the encoded data frames into a decoding section at the selected bit rate, the bit rate being selected based on the sizes, wherein the decoding section comprises means for storing the encoded data frames; and
   means for calculating configured to:
   calculate delay time information from a start of the inputting to completion of decoding of the encoded data frames, the delay time information including delay times corresponding to delay intervals between the encoded data frames;
   select each of the encoded date frames for processing in a sequential order, the sequential order indicating performing the selection from an encoded data frame to be decoded last to an encoded data frame to be decoded first;
   calculate the delay times in the sequential order based on the sizes of the selected encoded data frames and the selected bit rate, wherein calculating the delay times includes calculating a delay time for a selected encoded data frame based on a total amount of data, the total amount of data being calculated based on a size of the selected encoded data frame and a size of a second encoded data frame to be decoded after the selected encoded data frame is decoded, the second encoded data frame being stored in the means for storing before the selected encoded data frame is read for decoding.

2. The data processing apparatus of claim 1, wherein the delay time information indicates decoding the encoded data frame to be decoded last, when the encoded data frame to be decoded last is inputted into the decoding section.

3. The data processing apparatus of claim 1, wherein the means for calculating is further configured to:
- multiply a time required for decoding a single encoded data frame with the selected bit rate to calculate a first amount of data;
- subtract the first amount of data from the total amount of data;
- determine a maximum from a result of the subtraction and zero, as a second amount of data; and
- calculate a delay time for the selected encoded data frame by dividing a total of the second amount of data and the size of the selected encoded data frame by the selected bit rate.

4. The data processing apparatus of claim 1, further comprising means for adding the delay time information into the encoded data frames.

5. The data processing apparatus of claim 1 wherein, the means for calculating, calculates the plurality of delay times after the sizes have been specified.

6. The data processing apparatus of claim 1 wherein, the decoding section comprises means for storing the encoded data frames, and the means for specifying sizes selects the bit rate to prevent overflow and underflow of the means for storing by minimizing a total of the plurality of delay times.

7. The data processing apparatus of claim 1 wherein, the decoding section comprises means for storing the encoded data frames until decoding of the encoded data frames begins, and the means for calculating determines a remaining capacity of the means for storing based on the stored encoded data frames.

8. A data processing method for calculating delay time information from when a decoding section starts receiving encoded data frames to when the data is decoded, the method comprising:
- specifying sizes corresponding to the encoded data frames, the encoded data frames to be decoded in a predetermined sequence;
- selecting a bit rate for inputting the encoded data frames into the decoding section at the selected bit rate, the bit rate being selected based on the sizes;
- storing the encoded data frames in the decoding section;
- calculating the delay time information, the delay time information including delay times corresponding to delay intervals between the encoded data frames;
- selecting each of the encoded data frames, for processing in a sequential order, the sequential order indicating performing the selection from an encoded data frame to be decoded last to an encoded data to be decoded first; and
- calculating the delay times in the sequential order based on the sizes of the selected encoded data frames and the selected bit rate, wherein calculating the delay times includes calculating a delay time for a selected encoded data frame based on a total amount of data, the total amount of data being calculated based on a size of the selected encoded data frame and a size of a second encoded data frame to be decoded after the selected encoded data frame is decoded, the second encoded data frame being stored in the decoding section before the selected encoded data frame is read for decoding.

9. An encoding device comprising:
- means for encoding data to generate encoded data frames to be decoded in a predetermined sequence;
- means for specifying sizes corresponding to each of the encoded data frames;
- means for selecting a bit rate for inputting the encoded data frames into a decoding section at the selected bit rate, the bit rate being selected based on the sizes, wherein the encoded data frames are stored in the decoding section;
- means for calculating delay time information from when the decoding section starts receiving as input the encoded data frames to when the encoded data frames are decoded, the delay time information including delay times corresponding to delay intervals between the encoded data frames; and
- means for adding the delay time information to the encoded data frames, wherein the means for calculating selects each of the encoded data frames, for processing in a sequential order, the sequential order indicating performing the selection from an encoded data frame to be decoded last to an encoded data frame to be decoded first, and calculates the delay times in the sequential order based on the sizes of the selected encoded data frames and the selected bit rate, and
- wherein calculating the delay times includes calculating a delay time for a selected encoded data frame based on a total amount of data, the total amount of data being calculated based on a size of the selected encoded data frame and a size of a second encoded data frame to be decoded after the selected encoded data frame is decoded, the second encoded data frame being stored in the decoding section before the selected encoded data frame is read for decoding.

* * * * *